United States Patent
Fukumitsu

(10) Patent No.: US 10,432,809 B2
(45) Date of Patent: Oct. 1, 2019

(54) READING APPARATUS AND IMAGE GENERATION METHOD

(71) Applicant: SEIKO EPSON CORPORATION, Tokyo (JP)

(72) Inventor: Yasunori Fukumitsu, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/958,013

(22) Filed: Apr. 20, 2018

(65) Prior Publication Data
US 2018/0343353 A1 Nov. 29, 2018

(30) Foreign Application Priority Data
May 24, 2017 (JP) .................. 2017-102404

(51) Int. Cl.
*H04N 1/00* (2006.01)
*H04N 1/387* (2006.01)

(52) U.S. Cl.
CPC ..... *H04N 1/00694* (2013.01); *H04N 1/00734* (2013.01); *H04N 1/00737* (2013.01); *H04N 1/00753* (2013.01); *H04N 1/00774* (2013.01); *H04N 1/3873* (2013.01); *H04N 1/387* (2013.01)

(58) Field of Classification Search
CPC ........... H04N 1/00694; H04N 1/00734; H04N 1/00737; H04N 1/00753; H04N 1/00774; H04N 1/3873
USPC ....................................................... 358/448
See application file for complete search history.

(56) References Cited

U.S. PATENT DOCUMENTS

| | | | | |
|---|---|---|---|---|
| 5,113,251 A * | 5/1992 | Ichiyanagi | ............... | H04N 1/58 358/453 |
| 9,241,086 B1 * | 1/2016 | Hayashi | ............. | H04N 1/02815 |
| 2004/0170324 A1 * | 9/2004 | Eguchi | ................. | G06K 9/4604 382/199 |
| 2007/0201105 A1 * | 8/2007 | Shoda | .................. | H04N 1/4095 358/449 |
| 2009/0046313 A1 * | 2/2009 | Minamino | ........... | H04N 1/4074 358/1.13 |
| 2010/0271646 A1 * | 10/2010 | Morimoto | .......... | G03G 15/5025 358/1.9 |
| 2013/0215480 A1 * | 8/2013 | Iwayama | ................. | H04N 1/04 358/475 |

(Continued)

FOREIGN PATENT DOCUMENTS

| | | |
|---|---|---|
| CN | 103662905 A | 3/2014 |
| CN | 104301581 A | 1/2015 |

(Continued)

OTHER PUBLICATIONS

Ryo et al., Image processing Device Region Detection Method and Computer Program, Jun. 10, 2016; Machine Translated Japanese Patent Application Publication, JP2016178552, All Pages (Year: 2016).*

*Primary Examiner* — Allen H Nguyen

(57) ABSTRACT

A clipping processor is configured to estimate a background pixel value which is a read value of a background board and to clip an image of an original document from a read image based on the background pixel value which is estimated, the read value changing due to an increase in distance between a sensor and the background board caused by the original document, the read image being a result of reading an area including the original document and the background board.

8 Claims, 8 Drawing Sheets

(56) References Cited

U.S. PATENT DOCUMENTS

2014/0079460 A1    3/2014  Kanaya
2015/0022868 A1    1/2015  Shimizu

FOREIGN PATENT DOCUMENTS

JP        5532176 B1    6/2014
JP      2016-178464 A   10/2016

* cited by examiner

| DISTANCE H | READ VALUE |
|---|---|
| h0 | 20 |
| h1 | 20 |
| h2 | 21 |
| ⋮ | ⋮ |
| hx | 50 |
| ⋮ | ⋮ |
| hmax | 90 |

| LINE NUMBER | DISTANCE H |
|---|---|
| ⋮ | ⋮ |
| 11 | *** |
| 12 | *** |
| 13 | *** |
| 14 | hx |
| 15 | *** |
| ⋮ | ⋮ |

FIG. 6

| LINE NUMBER | READ VALUE |
|---|---|
| ⋮ | ⋮ |
| 11 | 20 |
| 12 | 40 |
| 13 | 40 |
| 14 | 50 |
| 15 | 60 |
| ⋮ | ⋮ |

40

READING APPARATUS AND IMAGE GENERATION METHOD

BACKGROUND

1. Technical Field

The present invention relates to a reading apparatus and an image generation method.

2. Related Art

A scanner clips an image (original document image) in an area corresponding to an original document from a read image obtained by reading the original document.

An image reading apparatus configured to extract an edge of a medium from image data obtained by imaging the medium and to perform clipping of the medium on the image data based on the extracted edge is known (see JP-A-2016-178464).

A boarder (edge) of the original document is detected based on the presence or absence of a read value of a background board serving as a background of the original document during reading of the original document to clip the original document image. Here, in a scanner, when the original document is read, the distance between a reading unit and the background board may change depending on the thickness of the original document. When the distance between the reading unit and the background board changes, the read value of the background board also changes. Therefore, the difference between the read value of the background board and the read value of the original document becomes unclear, and the accuracy of clipping of the original document image may degrade.

SUMMARY

An advantage of some aspects of the invention is that a reading apparatus and an image generation method which increase accuracy of clipping of an original document image are provided.

An aspect of the invention is a reading apparatus configured to read an original document between the background board and a platen and including a clipping processor configured to estimate a background pixel value which is a read value of the background board and to clip an image of the original document from a read image based on the background pixel value which is estimated, the read value changing due to an increase in distance between the platen and the background board caused by the original document, the read image being a result of reading an area including the original document and the background board.

With this configuration, the clipping processor estimates the background pixel value which changes due to an increase in distance between the platen and the background board caused by the original document. This enables the image of the original document to be accurately clipped from the read image based on the background pixel value which is estimated, the read image being a result of reading the area including the original document and the background board.

In this case, the clipping processor may be configured to specify an area to be clipped after replacing the background pixel value which is estimated and which is included in the read image with a prescribed value and to clip the area which is specified.

With this configuration, the clipping processor replaces the background pixel value which is estimated and which is included in the read image with the prescribed value, which enables the image of the original document to be easily and accurately clipped based on a logic of detecting edges of the original document depending on the presence or absence of the prescribed value.

In this case, the reading apparatus further includes a measurement unit configured to measure the distance between the platen and the background board, wherein the clipping processor may be configured to estimate the background pixel value based on a result of measurement by the measurement unit.

This configuration enables the clipping processor to estimate the background pixel value based on the result of measurement, that is, an actual change of the distance between the platen and the background board.

In this case, the clipping processor may be configured to estimate, based on a read value obtained by reading the background board in an original document non-existent area where the original document does not exist, the background pixel value in a peripheral area of the original document, the peripheral area being different from the original document non-existent area.

This configuration enables the clipping processor to estimate the background pixel value in the peripheral area of the original document based on the read value obtained by reading the background board in the original document non-existent area, that is, the actual change of the read value of the background board.

In this case, the clipping processor may be configured to estimate, based on a read value obtained by reading the background board in the original document non-existent area on each of both sides of the original document, the background pixel value in the peripheral area on each of the both sides of the original document.

This configuration enables the clipping processor to estimate the background pixel value in the peripheral area on each of both sides of the original document based on the read value obtained by reading the background board in the original document non-existent area on each of the both sides of the original document.

An aspect of the invention is a reading apparatus configured to read an original document transported between a background board and a platen by using a sensor, wherein the platen extends across an original document existent area and an original document non-existent area, the original document which is transported passes over the original document existent area, the original document which is transported does not pass over the original document non-existent area, and the sensor and the background board can grasp a component extending across the original document existent area and the original document non-existent area.

This configuration enables the background board to be read by the sensor in the original document non-existent area concurrently with reading of the original document by the sensor along with the transportation of the original document.

The technical idea of the invention is realized in various aspects in addition to the category of the reading apparatus. The scope of the invention includes, for example, a method (image generation method) including a step performed by the reading apparatus, a program for causing hardware (computer) to perform the method, and a computer-readable storage medium which stores the program.

BRIEF DESCRIPTION OF THE DRAWINGS

The invention will be described with reference to the accompanying drawings, wherein like numbers reference like elements.

FIG. 4 is a view illustrating a background board read value table.

FIG. 5 is a view illustrating a background board distance table.

FIG. 6 is a view illustrating a flow of processes performed on a read image.

DESCRIPTION OF EXEMPLARY EMBODIMENTS

With reference to the drawings, embodiments of the invention will be described below. Note that the drawings are mere examples illustrating the present embodiments.

1. General Description of Apparatus

Figure 1:
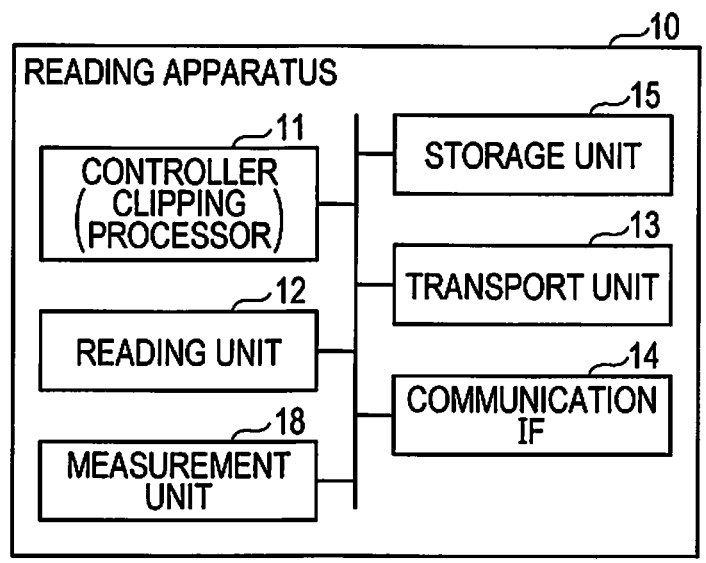
FIG. 1 is a view schematically illustrating the configuration of a reading apparatus.

FIG. 1 schematically shows the configuration of a reading apparatus 10 according to the present embodiments. The reading apparatus 10 is a subject that performs an image generation method. The reading apparatus 10 is a scanner which is capable of optically reading an original document and storing image data as a result of the reading or outputting the image data to the outside. The reading apparatus 10 is, for example, a document scanner capable of transporting a plurality of original documents one by one and continuously reading them. Alternatively, the reading apparatus 10 may be a flatbed scanner capable of reading an original document stationary mounted on a document platen or a product which serves as both a document scanner and a flatbed scanner.

The reading apparatus 10 includes, for example, a controller 11, a reading unit 12, a transport unit 13, a communication interface (IF) 14, a storage unit 15, and a measurement unit 18. The controller 11 includes, for example, a processor (CPU or ASIC or a combination thereof), one or a plurality of ICs including ROM, RAM, and the like, and other types of memory. The controller 11 controls the behavior of the entire reading apparatus 10 by cooperation of installed programs and hardware. The storage unit 15 is a non-volatile memory apparatus. The storage unit 15 may be a part of the controller 11.

The transport unit 13 is a transport mechanism which transports an original document mounted on a document tray (not shown) along a prescribed transport passage under control by the controller 11. The transport unit 13 may include an auto document feeder (ADF) which transports a plurality of original documents mounted on the document tray one by one.

The reading unit 12 is a unit configured to read the original document under control by the controller 11, and as is known, includes a light source, an optical system, an image sensor, and the like. The controller 11 is configured to perform image processing or an analysis on a read image output from the image sensor and to clip an original document image from the read image as described later. Moreover, the controller 11 is configured to store the original document image in, for example, the storage unit 15 or to transmit the original document image to the outside via the communication IF 14.

The communication IF 14 is an IF which performs wired or wireless communication externally based on a prescribed communication protocol including a known communication standard. For example, a personal computer (PC) is connected to the communication IF 14, and the original document image (image data) is transmitted to the PC via the communication IF 14. Alternatively, a connection to a telephone line is established via the communication IF 14, and communication with a facsimile apparatus may be performed based on a FAX protocol. Although not shown, the reading apparatus 10 accordingly includes known components, for example, a display unit configured to display visual information and an operation unit such as a touch screen or a physical button configured to receive an operation given by a user.

The reading apparatus 10 may be a multi-function device which serves as a printer and the like in addition to a scanner.

Figure 2:
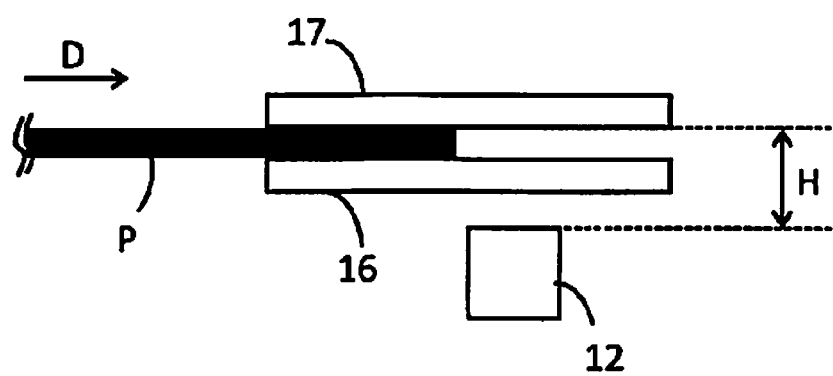
FIG. 2 is a view schematically illustrating a part of the reading apparatus in a housing.

FIG. 2 schematically shows a part of the reading apparatus 10 in a housing. An original document P transported by the transport unit 13 along a transport direction D is transported between a platen 16 and a background board 17 which face each other. The platen 16 is made of a transparent material such as glass. The reading unit 12 is disposed on a side of the platen 16 opposite to the background board 17. The background board 17 is a member having a prescribed color, for example, a gray member of a prescribed density and is irradiated with light from a light source included in the reading unit 12. The reading unit 12 receives, by an image sensor, reflected light of the light irradiated from the light source (light reflected off the background board 17 and the original document P) to perform reading.

The reading unit 12 includes a line sensor including a plurality of image sensors aligned along a direction (direction perpendicular to the paper surface of FIG. 2) orthogonal to the transport direction D. The reading unit 12 reads a line image (image in which a plurality of pixels are aligned in a line) by performing a single reading operation. The reading unit 12 repeatedly a line-image reading process at a prescribed frequency to obtain a two-dimensional image which includes a plurality of line images aligned in a direction orthogonal to the longitudinal direction of the line images, that is, a read image of an area including the entirety of a side of the original document P. FIG. 2 shows a configuration for reading one side (in FIG. 2, a side facing downward) of the original document P, but the reading apparatus 10 may be a scanner which is configured to further read the other side (in FIG. 2, a side facing upward) of the original document P and is capable of performing double-sided reading.

Here, the background board 17 is urged toward the platen 16 by an elastic member (not shown). Alternatively, a unit which includes the reading unit 12 and the platen 16 is urged toward the background board 17 by an elastic member (not shown). The unit which includes the reading unit 12 and the platen 16 may be referred to as a reading unit. Alternatively, each of the background board 17 and the unit which includes the reading unit 12 and the platen 16 is urged as described above. Thus, when the original document P is transported along the transport direction D by the transport unit 13 and is inserted between the platen 16 and the background board 17, the original document P pushes the background board 17, thereby increasing the distance between the platen 16 and the background board 17 depending on the thickness of the original document P. Since the platen 16 and the reading unit 12 are collectively displaced, the distance between the platen 16 and the reading unit 12 is invariable (has a fixed value). Thus, a change of the distance between the platen 16 and the background board 17 means a change of a distance H between the reading unit 12 and the background board 17.

With this configuration, the controller 11 performs the image generation method (image generation process) including an estimation step and a clipping step. In the estimation step, a background pixel value which is a read value of the background board 17 is estimated. The read value changes due to an increase in distance between the platen 16 and the background board 17 caused by the original document P. In the clipping step, an image of the original document is clipped from a read image based on the background pixel value which is estimated. The read image is a result of reading an area including the original document P and the background board 17. The controller 11 corresponds to a clipping processor according to the invention. Several embodiments of the image generation process will be described below.

2. First Embodiment

Figure 3:
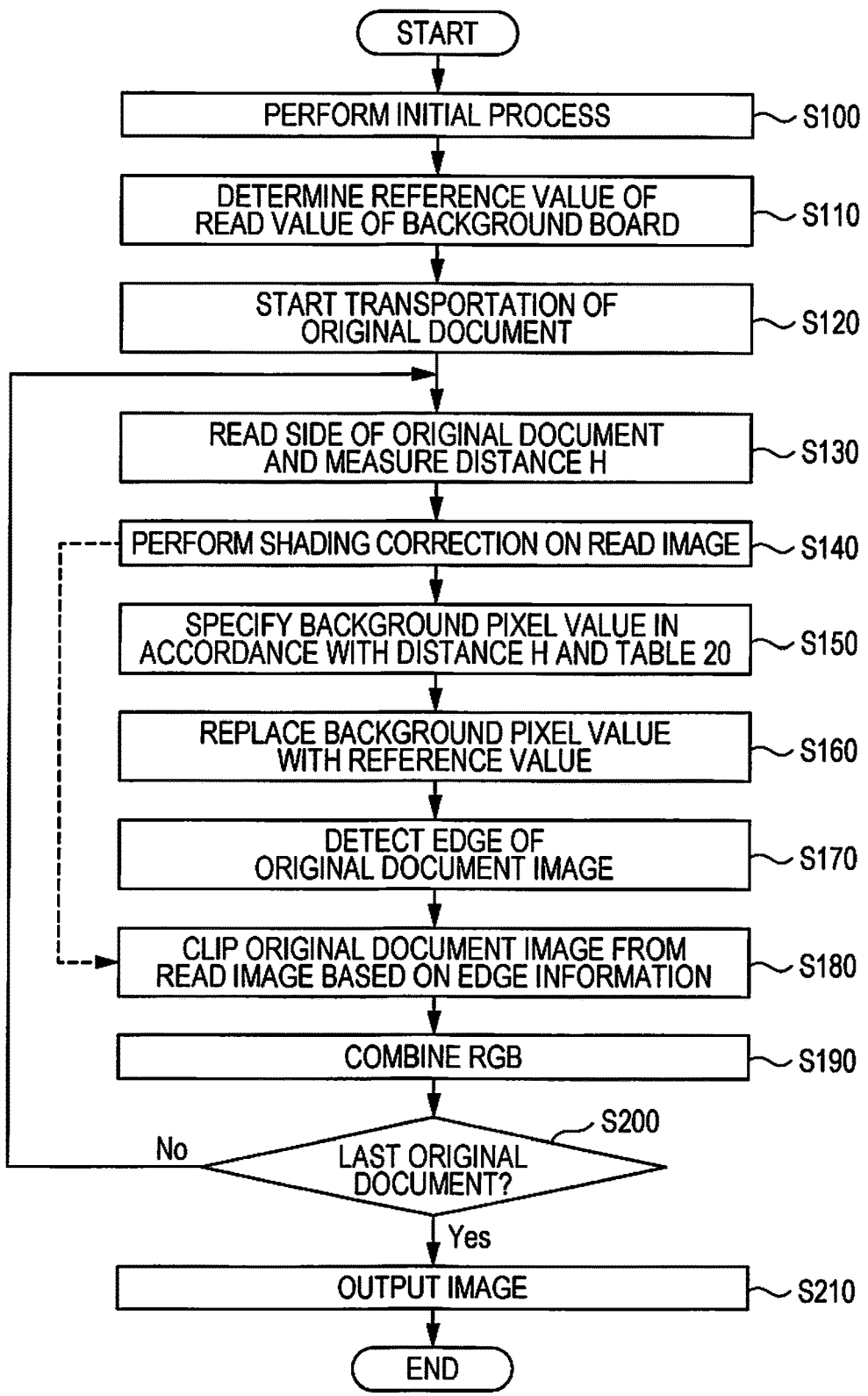
FIG. 3 is a flowchart illustrating an image generation process according to a first embodiment.

FIG. 3 shows an image generation process according to a first embodiment in a flowchart. The flowchart begins when a user sets a desired original document P on the reading apparatus 10 and presses down a prescribed scan start button. Note that in the first embodiment, a background board read value table 20 is stored in the storage unit 15 as a prerequisite for starting the image generation process. The background board read value table 20 defines a read value of the background board 17 in accordance with the distance H between the reading unit 12 and the background board 17.

FIG. 4 shows an example of the background board read value table 20. The reading apparatus 10 generates and stores the background board read value table 20 before performing the image generation process. Specifically, the reading apparatus 10 (a worker in a manufacturing factory of the reading apparatus 10) creates situations which vary with the distance H between the reading unit 12 and the background board 17 stepwise from a prescribed minimum value h, h1, h2 . . . to a prescribed maximum value hmax (where h0<h1<h2 . . . <hmax). For example, the minimum value h0 corresponds to a distance H of a case where the platen 16 and the background board 17 are closest to each other. The controller 11 performs a process of causing the reading unit 12 to repeatedly perform reading of the background board 17 to obtain read values and storing the distance H ((h0, h1, h2 . . . hmax)) at the times of the reading and the read values of the background board 17 output from the reading unit 12 in association with each other for the situations. The background board read value table 20 is thus generated and stored. Note that the reading apparatus 10 itself may change the distance H by using a motor.

Here, read values and pixel values shown in FIG. 4 (and FIGS. 6, 9, and 11 described later), for example, numerical values such as read values 20 to 90 in FIG. 4, are gray scale values obtained by normalizing values read by the reading unit 12 into a prescribed numerical value range. It can also be said that these read values and pixel values denote the color densities of a reading object. A smaller numerical value means a higher density (a darker color), and a larger numerical value means a lower density (a lighter color). According to the example in FIG. 4, as the distance H increases, the read value of the background board 17 corresponds to a lighter color. Note that each numerical value shown in FIGS. 4, 6, 9, and 11 is merely a value for the sake of explanation of the present embodiment and does not limit the disclosure of the invention.

Return now to the description of FIG. 3.

The controller 11 which detects that the scan start button is pressed down first performs a prescribed initial process (step S100). The initial process is a standard process for reading the original document P and includes, for example, a process of causing the reading unit 12 to read a white or black standard reflector.

Next, the controller 11 causes the reading unit 12 to read the background board 17 to determine a reference value (background reference value) of the read value of the background board 17 (step S110). In step S110, transportation of the original document P has not been started, and therefore, the distance between the platen 16 and the background board 17 is not increased (e.g., distance H=h0). In step S110, the controller 11, for example, causes the reading unit 12 to read the background board 17 for several times and calculates an average of pixel value included in the plurality of line images obtained by the several times of reading, thereby obtaining the background reference value. The background reference value determined in step S110 is, for example, 20 according to FIG. 4.

Then, the controller 11 causes the transport unit 13 to start transporting the original document P (step S120). The controller 11 causes the reading unit 12 to perform reading of a side of one original document P and the measurement unit 18 to measure the distance H (step S130). As a result of the reading of the side in step S130, a two-dimensional read image is obtained. The two-dimensional read image is a result of reading an area including the entirety of the original document P and a part of the background board 17 around the original document P.

The controller 11 performs, on the read image obtained in step S130, a prescribed shading correction (step S140), and the process proceeds to step S150.

Measurement of the distance H by the measurement unit 18 will be described. The measurement unit 18 may be any unit as long as it is capable of measuring the distance H. The measurement unit 18 is, for example, a ranging sensor provided on the background board 17 and configured to measure the distance to the reading unit 12. Alternatively, the measurement unit 18 may be an encoder configured to detect a displacement amount of the reading unit 12 with reference to the location of the background board 17 (or a displacement amount of the background board 17 with reference to the location of the reading unit 12). In both cases, in step S130, the controller 11 causes the measurement unit 18 to repeatedly measure the distance H in synchronism with the reading operation repeatedly performed by the reading unit 12 so as to acquire the distance H for each time the reading operation is performed, that is, for each line image included in the read image, and to store the distance H. As a result of step S130, the controller 11 obtains a correspondence relationship between each line image included in the read image and the distance H (a background board distance table 30).

FIG. 5 shows an example of the background board distance table 30 generated and stored by the controller 11 in step S130. The background board distance table 30 defines a correspondence relationship between a number (line number) of each line image included in the read image and the distance H. The controller 11 manages the line images by assigning a smaller line number to a line image which is read earlier by the reading unit 12. Transporting the original document P having a thickness between the platen 16 and the background board 17 may change the distance between the platen 16 and the background board 17 as described above. Thus, the distance H defined by the background board distance table 30 may be different for each line number.

As described above, the distance between the reading unit 12 and the platen 16 is invariable. Thus, measuring the distance H also means (indirectly) measuring the distance between the platen 16 and the background board 17. Thus, it can also be said that the measurement unit 18 measures the distance between the platen 16 and the background board 17. The measurement unit 18 may actually measure the distance between the platen 16 and the background board 17 and add a fixed value which is the distance between the reading unit 12 and the platen 16 to the distance which is measured, thereby computing the distance H. Alternatively, in the present embodiment, the distance H may be understood as a distance between the platen 16 and the background board 17 which is measured by the measurement unit 18.

In step S150, the controller 11 reads the read value of the background board 17 corresponding to the distance H for each line image included in the read image from the background board read value table 20 and specifies a pixel (hereinafter referred to as a background pixel value) which is a target to be replaced with a background reference value in the line image. In this case, the controller 11 focuses attention on one line image, reads, from the background board distance table 30, a distance H corresponding to the line number of the line image in the focus of attention (interest line image), and further reads, from the background board read value table 20, a read value associated with the distance H which is read. When the read value which is read is not included in the prescribed reference range (background reference range) relating to the read value of the background board 17, the controller 11 specifies, as the background pixel value, a pixel value which is the same as the read value which is read and which is included in pixel values of pixels included in the interest line image.

The controller 11 sets the background reference range based on the background reference value determined in step S110. For example, when the background reference value is 20 as described above, a range ±α from the background reference value (for example, a range of 15 to 25, where α=5) is set as the background reference range in consideration of a certain margin. The controller 11 performs the process in step S150 on all the line images included in the read image with the line images being deemed as interest line images.

In step S160, the controller 11 replaces the background pixel values specified in step S150 with the background reference values.

In step S170, the controller 11 detects edges of the original document image from a read image after the background pixel values are replaced with the background reference values in step S160.

Figure 6:
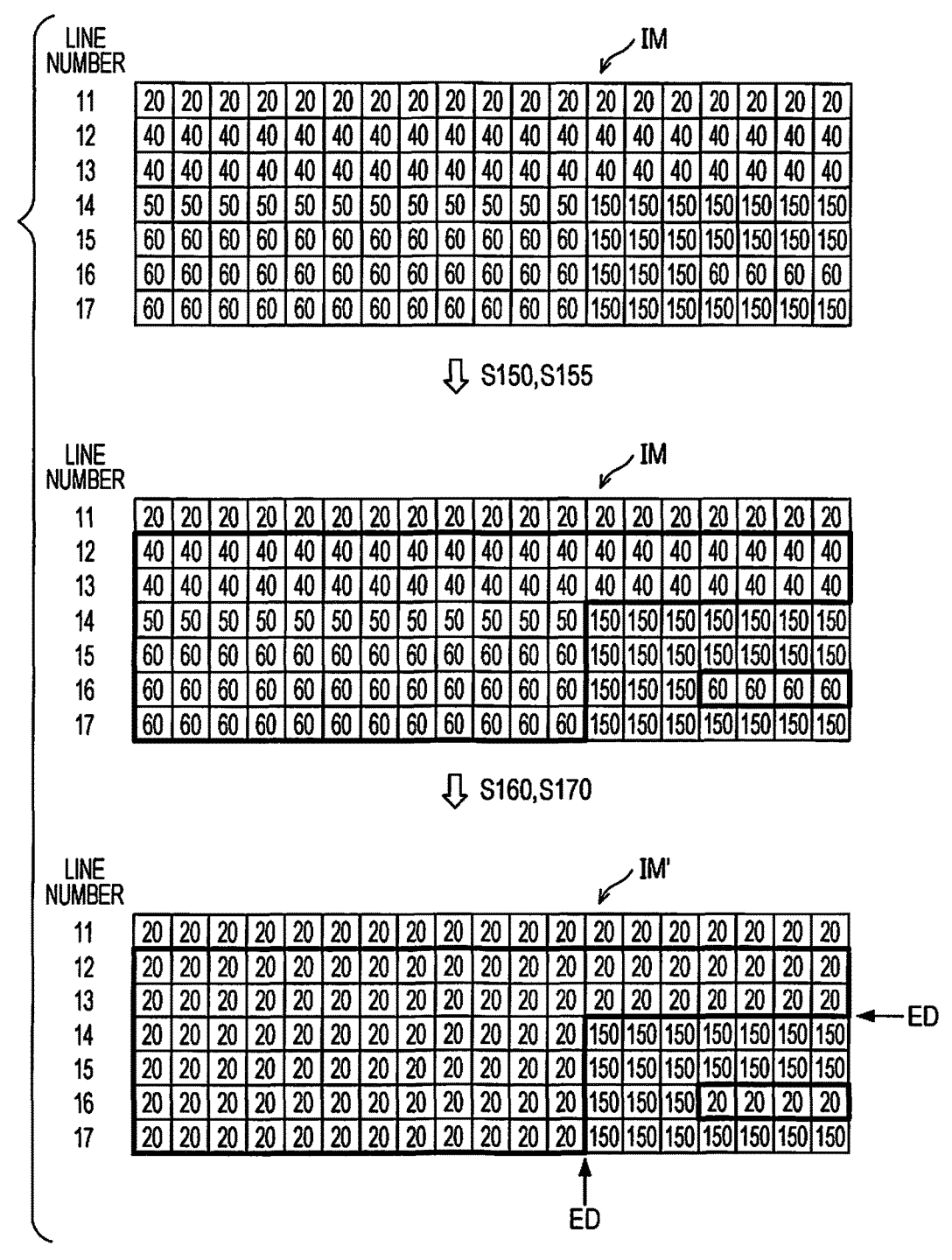

FIG. 6 is a view illustrating steps S150 to S170 based on a part of the read image. A read image IM shown in the upper section in FIG. 6 is a part of the read image serving as the process target in step S150. In FIG. 6 (and in FIG. 11 described later), rectangles included in the read image IM denote pixels, and the numerical values in the pixels are pixel values of the pixels. In FIG. 6 (and in FIG. 11 described later), for the sake of description, line numbers are also shown for the line images (pixel rows each including a plurality of pixels aligned in the lateral direction in the figure) included in the read image IM.

In step S150, the controller 11 defines, for example, the line image of line number 14 as the interest line image. Moreover, the distance H corresponding to the line image of line number 14 is assumed to be hx (see FIG. 5). In this case, the controller 11 reads read value 50 corresponding to the distance hx from the background board read value table 20 (see FIG. 4). As in the above-described example, when the background reference range is 15 to 25, read value 50 is out of the background reference range. Thus, the controller 11 specifies, as the background pixel value, pixel value 50 which is a pixel value included in the interest line image and which is the same as read value 50. Similarly, when the controller 11 defines the line image of line number 15 as the interest line image, the controller 11 reads, from the background board read value table 20, read value 60 corresponding to the distance H corresponding to the interest line image. Also in this case, read value 60 is out of the background reference range (15 to 25), and therefore, the controller 11 specifies, as the background pixel value, pixel value 60 which is a pixel value included in the interest line image and which is the same as read value 60. As a result that the controller 11 performs the process on the line images (as a result of step S150), the controller 11 can specify, as the background pixel values, pixel values in areas surrounded by thick line frames as shown in the middle section in FIG. 6.

Note that areas represented by pixel value 150 in the read image IM shown in FIG. 6 correspond to areas where a color (for example, the color of the sheet of the original document P) of the original document P itself is read. Moreover, as shown in the read image IM in the upper and middle sections in FIG. 6, four successive areas which are in the line image of line number 16, have pixel value 60, and are surrounded by areas each having pixel value 150 correspond to any image (for example, a part of a character) expressed on the original document P. That is, in the line image of line number 16, read value 60 of the image expressed on the original document P coincides with read value 60 of the background board 17 and is thus specified as the background pixel value in step S150.

The controller 11 replaces each of the pixel values in the areas surrounded by the thick line frames in the read image IM shown in the middle section in FIG. 6 with background reference value 20 to generate a read image IM' as shown in the lower section in FIG. 6 (step S160). Then, the controller 11 detects edges ED of the original document image from the read image IM' (step S170). In step S170, the controller 11 basically specifies a pixel value in the background reference range in the read image (read image IM') as the pixel value of the background board 17. Note that the pixel value of the image expressed on the original document P may fall within the background reference range. Thus, the controller 11 specifies the largest rectangle surrounded by areas where pixel values in the background reference range are consecutive in the read image IM' and detects the sides of the rectangle which are specified as the edges ED of the original document image (see the lower section in FIG. 6). The edges ED of the original document image are detected in this way, which enables erroneous detection of the edges ED based on the pixel value of the image expressed on the original document P to be avoided.

In step S180, the controller 11 clips the original document image from the read image based on edge information. Note that the read image which is a process target in step S180 is the read image after the process in step S140. In other words, the controller 11 uses the read image after the process in step S140 in each of the process in step S150 (to S170) and the process in step S180. The read image used in the processes in steps S150 to S170 is merely a read image for detecting the edges of the original document image, and the image on the original document P can be a target of replacement in step S160, and therefore, the read image used in the processes in steps S150 to S170 is not appropriate as a target for actually clipping the original document image. The edge information used in step S180 is information (information denoting the location of the edges ED of the original document image in the read image) of the edges detected in step S170. Thus, the controller 11 clips an image area surrounded by the edges denoted by the edge information in the read image as the original document image in step S180.

In step S190, the controller 11 combines original document images of colors of red, green, and blue (RGB) by a known computation method to generate a color image. Detailed description is omitted, but when the reading apparatus 10 (reading unit 12) is a model capable of color scanning, read images of the colors of RGB are generated in step S130, and an original document image is clipped from the read images of the colors of RGB in step S180. Thus, the original document images of the colors of RGB are combined to generate a color image having pixel values of the colors of RGB for each pixel. Note that the processes in step S150 to S170 are performed at least based on the read image of any of the colors of RGB. When the reading apparatus 10 (reading unit 12) is a model capable of only monochrome scanning, step S190 is unnecessary.

In step S200, the controller 11 determines whether or not processes subsequent to step S130 are completed for all original documents P mounted on the document tray after transportation of the original document P is started in step S120, and if there is an original document P for which the processes are not completed (if No is determined in step S200), the controller 11 performs the processes subsequent to step S130 on the original document P for which the processes are not completed. On the other hand, when the processes subsequent to S130 are completed for all the original documents P (if YES is determined in step S200), the controller 11 outputs a file in which original document images in step S190 (or step S180) corresponding to the original documents P are collected (step S210), and the flowchart in FIG. 3 ends. The output in step S210 means, for example, storing the file in a prescribed storage unit (for example, the storage unit 15), transferring the file to an external PC or the like via the communication IF 14, and printing the file.

3. Second Embodiment

Next, a second embodiment will be described.

Figure 7:
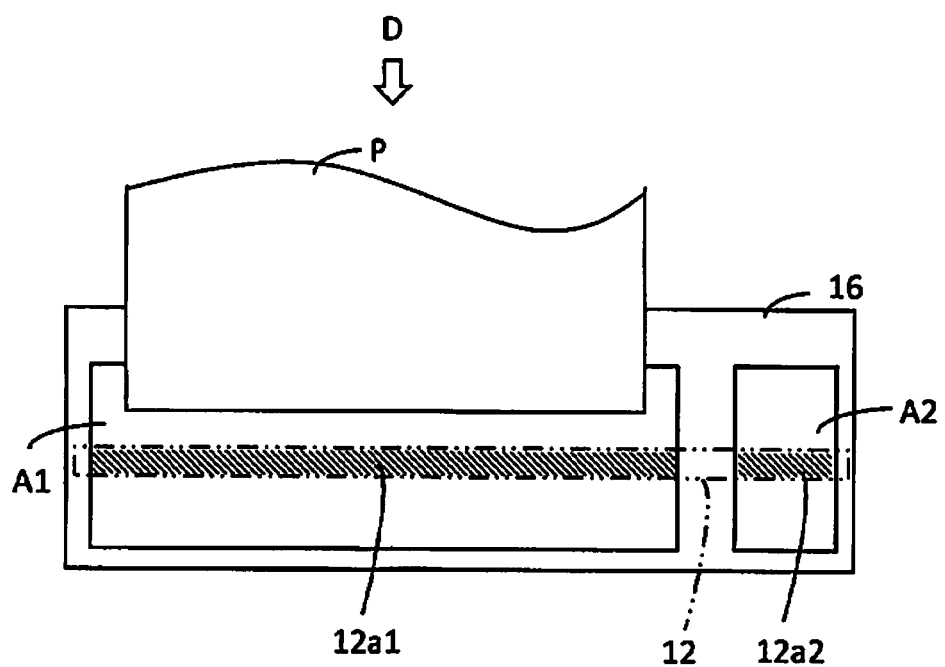
FIG. 7 is a view illustrating a part of the reading apparatus in the housing, from a viewpoint toward the platen from a background board.

FIG. 7 is a view illustrating a part of a reading apparatus 10 in a housing, from a viewpoint toward a platen 16 from a background board 17.

Figure 8:
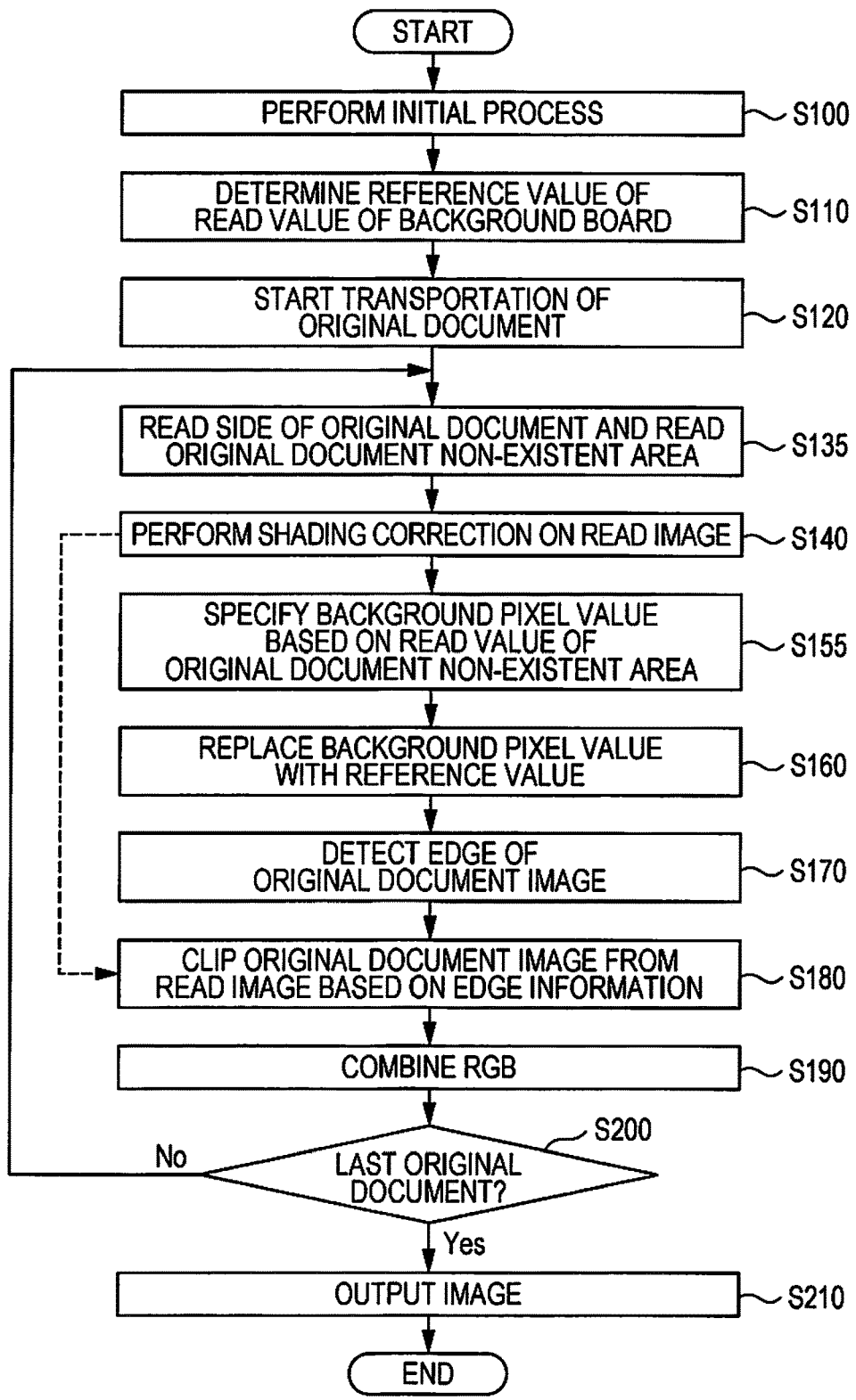
FIG. 8 is a flowchart illustrating image generation process according to a second embodiment.

Moreover, FIG. 8 shows an image generation process according to the second embodiment in a flowchart.

FIG. 7 shows that an original document P transported along a transport direction D passes over the platen 16. Moreover, when viewed from the viewpoint in FIG. 7, a reading unit 12 is disposed at a backside of the platen 16 (see the rectangle indicated by a long dashed double-short dashed line in FIG. 7), and the longitudinal direction of the reading unit 12 is orthogonal to the transport direction D. In the second embodiment, the platen 16 has an original document existent area A1 over which the original document P which is transported passes and an original document non-existent area A2 over which the original document P which is transported does not pass. The original document existent area A1 and the original document non-existent area A2 are aligned in the longitudinal direction of the reading unit 12. In other words, the platen 16 extends across the original document existent area A1 and the original document non-existent area A2. Moreover, a sensor (reading unit 12) for reading the original document P extends across the original document existent area A1 and the original document non-existent area A2. Moreover, the background board 17 facing the platen 16 also extends across the original document existent area A1 and the original document non-existent area A2.

In such a configuration, a plurality of image sensors constituting the entire length of the reading unit 12 include an image sensor belonging to an area 12a1 corresponding to the original document existent area A1 and an image sensor belongs to an area 12a2 corresponding to the original document non-existent area A2, and the reading unit 12 can simultaneously perform reading of the original document P and part of the background board 17 around the original document P by the image sensor belonging to the area 12a1 and reading of only the background board 17 by the image sensor belonging to the area 12a2. Note that the actual reading apparatus 10 does not has design which clearly indicates the original document existent area A1 and the original document non-existent area A2 as shown in FIG. 7. Moreover, the original document existent area and the original document non-existent area are used as expressions for indicating different areas of the platen 16 and are additionally used as expressions for indicating different areas of the background board 17 facing the platen 16. Moreover, the original document existent area and the original document non-existent area are used as expressions for indicating different portions of a space between the platen 16 and background board 17. The original document non-existent area usually refers to an area over which the original document P does not pass when a transport unit 13 transports a transportable sheet-like medium (original document P). However, in an exceptional situation, for example, in a situation where the original document P is transported in a significantly tilted position, a part of the original document P may pass over the original document non-existent area.

Similarly to the flowchart in FIG. 3, the flowchart shown in FIG. 8 begins when a user sets a desired original document P on the reading apparatus 10 and presses down a prescribed scan start button. In FIG. 8, processes which are the same as those in FIG. 3 are denoted by the same reference signs as those in FIG. 3. In the second embodiment, points different from the first embodiment are mainly described. In the second embodiment, the background board read value table 20 and the measurement unit 18 are not particularly required.

A controller 11 causes the transport unit 13 to start transporting the original document P (step S120), and causes the reading unit 12 to perform reading of a side of one original document P and reading of the background board 17 in the original document non-existent area A2 (step S135). That is, the controller 11 repeatedly perform reading of the original document P passing over the original document existent area A1 by the reading unit 12 (image sensor belonging to the area 12*a*1) and reading of the background board 17 in the original document non-existent area A2 by the reading unit 12 (image sensor belonging to the area 12*a*2) in synchronism with each other.

As a result of step S135, a two-dimensional read image which is a result of reading an area including the entirety of the original document P and a part of the background board 17 surrounding the original document P and a two-dimensional background board image which is a result of reading only the background board 17 in the original document non-existent area A2 are obtained at the same time. Moreover, as a result of step S135, the controller 11 generates and stores a background board distance table 40 which defines read values of line images included in the background board image.

Figures 9, 10:
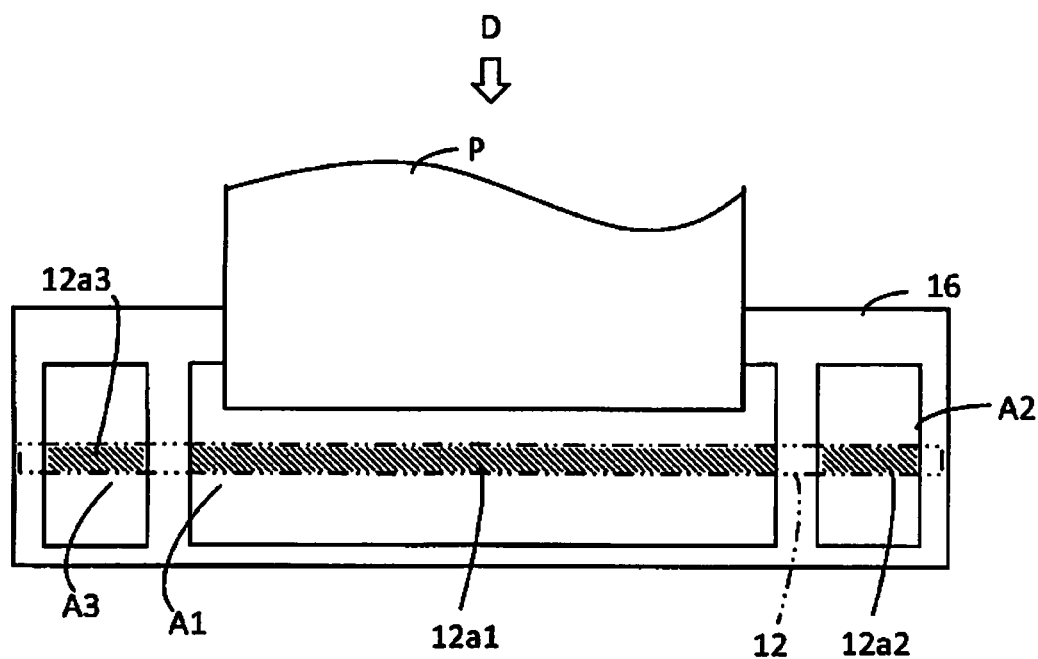
FIG. 9 is a view illustrating a background board read value table according to the second embodiment.
FIG. 10 is a view illustrating a part of a reading apparatus in a housing according to a variation, from a viewpoint toward the platen from a background board.

FIG. 9 shows an example of the background board read value table 40. In the background board read value table 40, line numbers of line images included in the background board image are associated with read values of the line images included in the background board image. The line numbers shown in the background board read value table 40 are also line numbers of the line images of the read image obtained at the same time as the background board image in step S135. Transporting the original document P having a thickness between the platen 16 and the background board 17 may change the distance between the platen 16 and the background board 17 as described above. Thus, the read value defined by the background board read value table 40 may be different for each line number.

The controller 11 performs, on the read image obtained in step S135, a prescribed shading correction (step S140), and the process proceeds to step S155. Note that the controller 11 may perform shading correction also on the background board image obtained in step S135 and then generate the background board read value table 40.

In step S155, the controller 11 reads a read value of the background board 17 for a corresponding one of the line images included in the read image from the background board read value table 40 and specifies a background pixel value which is a target to be replaced with a background reference value in the line image included in the read image. That is, a background pixel value is specified based on the read value obtained by reading the background board 17 in the original document non-existent area A2. In step S155, similarly to step S150 (FIG. 3), the controller 11 defines each line image included in the read image as an interest line image and reads a read value corresponding to the line number of the interest line image from the background board read value table 40. When the read value which is read is not included in the background reference range, the controller 11 specifies, as the background pixel value, a pixel value which is included in pixel values of pixels included in the interest line image and which is the same as the read value which is read. The processes following step S160 are as described with reference to FIG. 3.

The second embodiment will be specifically described with reference to FIG. 6. In the second embodiment, a read image IM shown in the upper section in FIG. 6 is a part of the read image (image read by the image sensor belonging to the area 12*a*1 of the reading unit 12) on which the process in step S155 is to be performed. In step S155, the controller 11 defines, for example, the line image of line number 14 of the read image IM as the interest line image. Moreover, the read value read from the background board read value table 40 correspondingly to line number 14 is 50 (see FIG. 9). As in the example described above, when the background reference range is 15 to 25, read value 50 is out of the background reference range, and therefore, the controller 11 specifies, as a background pixel value, pixel value 50 which is a pixel value included in the interest line image and which is the same as read value 50. As a result that the controller 11 performs the process on the line images of the read image IM (as a result of step S155), the controller 11 specifies, as background pixel values, pixel values in areas surrounded by thick line frames as shown in the middle section in FIG. 6.

Then, the controller 11 replaces each of the pixel values in the areas surrounded by the thick line frames in the read image IM shown in the middle section in FIG. 6 with background reference value 20 to generate a read image IM' as shown in the lower section in FIG. 6 (step S160). Then, the controller 11 detects edges ED of the original document image from the read image IM' (step S170).

4. Summary

According to the present embodiments, in the reading apparatus 10 configured to read the original document P between the background board 17 and the platen 16, the controller (clipping processor) 11 estimates a background pixel value which is the read value of the background board 17 (estimation step: step S150 in FIG. 3, step S155 in FIG. 8), wherein read value changes due to an increase in distance between the platen 16 and the background board 17 caused by the original document P. That is, the read value of the background board 17 is originally expected to be the background reference value or within the background reference range based on the background reference value, but the read value of the background board 17 becomes a value out of the background reference range due to the increase in distance between the platen 16 and the background board 17 as described above. The controller 11 specifies (estimates) such a pixel value which is out of the background reference range but which can be estimated to be the read value of the background board 17 as the background pixel value. Based on the background pixel value which is estimated, the controller 11 clips the original document image from the read image which is a result of reading an area including the original document P and the background board 17 (clipping step: steps S160 to S180 in FIGS. 3 and 8). This configuration enables the original document image to be accurately clipped even when the distance between the platen 16 (and the reading unit 12) and the background board 17 changes depending on the thickness of the original document P and the difference between the read value of the background board 17 and the read value of the original document P becomes unclear.

Moreover, according to the present embodiments, the controller 11 replaces the background pixel value which is estimated (specified) and which is included in the read image with a prescribed value, specifies an area (original document image) to be clipped, and then clips the specified area. That is, the controller 11 replaces the background pixel value of the read image with the prescribed value (background reference value), and then utilizes a logic of detecting the edges of the original document based on the presence or absence of a normal value (value within the background reference range) as the read value of the background board 17, which enables the original document image to be easily and accurately clipped.

Moreover, according to the first embodiment, the reading apparatus 10 includes the measurement unit 18 configured to perform measurement of the distance between the platen 16 and the background board 17 (distance between the reading unit 12 and the background board 17), and the controller 11 estimates the background pixel value based on the result of the measurement performed by the measurement unit 18. That is, the controller 11 causes the measurement unit 18 to measure the distance H concurrently with reading of the original document P to obtain information (background board distance table 30) regarding the distance H corresponding to the location of each of the line images (line numbers) of the read image (step S130 in FIG. 3). The information regarding the distance H and the background board read value table 20 which is prepared in advance and which defines the correspondence relationship between the distance H and the read value of the background board 17 are referred to estimate the background pixel value for each line image of the read image (step S150). Thus, even when a change of the distance H (i.e., a change of the read value of the background board 17) occurs at each timing at which the original document P which is transported is read by the reading unit 12, the background pixel value can be accurately specified, and thus, the original document image can be accurately clipped.

Moreover, in the second embodiment, the controller 11 estimates a background pixel value of an area in the periphery of the original document P different from the original document non-existent area A2 based on the read value obtained by reading the background board 17 in the original document non-existent area A2 where the original document P does not exist. That is, the controller 11 causes the reading unit 12 to read the background board 17 in the original document non-existent area A2 concurrently with the reading of the original document P in the original document existent area A1 to obtain information (background board read value table 40) regarding the read value of the background board 17 corresponding to the location of each line image (line number) of the read image (step S135 in FIG. 8). With reference to the background board read value table 40, the background pixel value is estimated for each line image of the read image (step S155). Thus, even when a change of the read value of the background board 17 occurs at each timing at which the reading unit 12 reads the original document P which is transported, the background pixel value can be accurately specified, and thus, the original document image can be accurately clipped.

5. Other Embodiments

The present embodiment is not limited to the above-described contents but may adopt, for example, aspects as described below.

Figure 11:
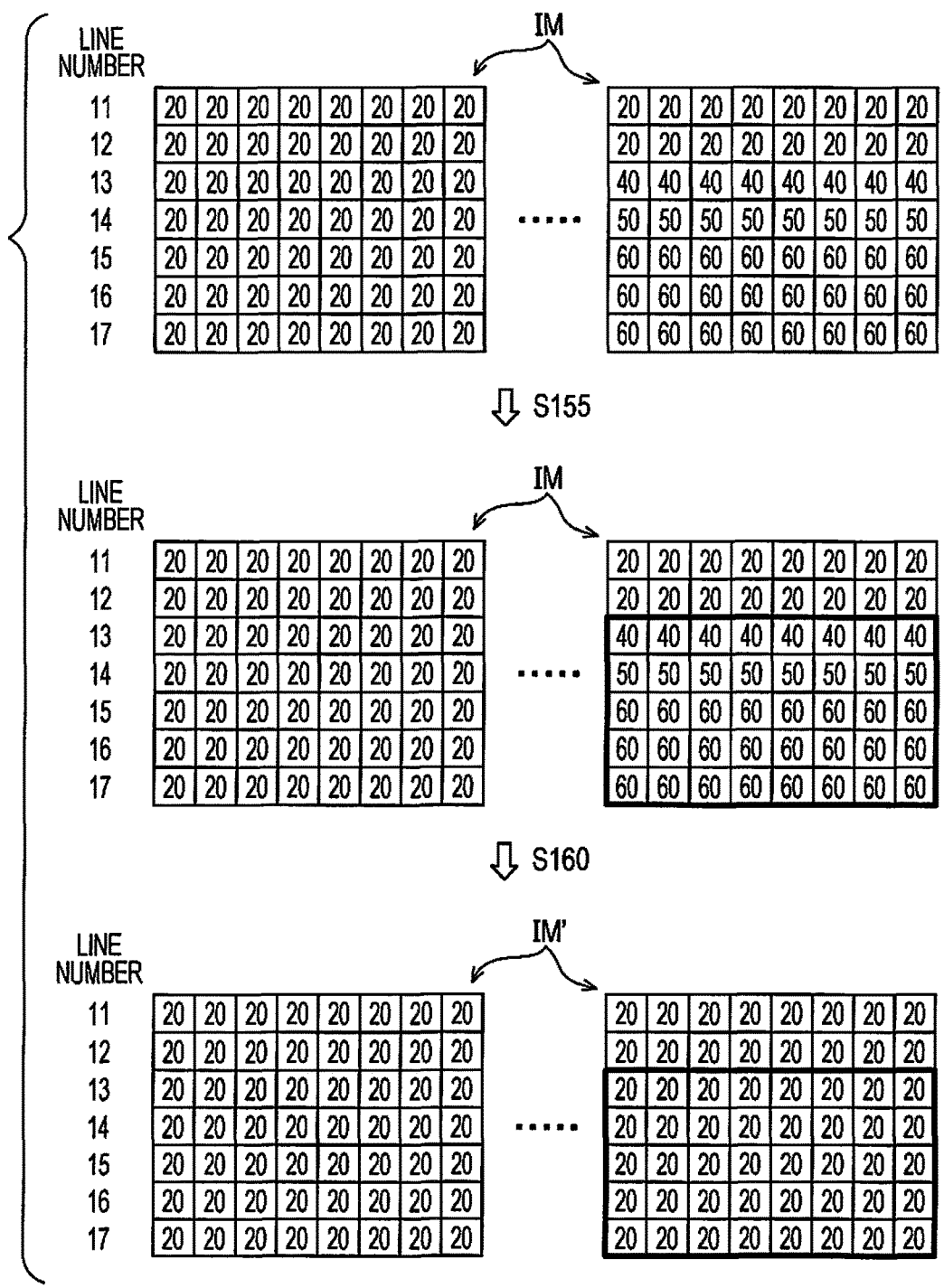
FIG. 11 is a view illustrating a flow of processes performed on a read image according to the variation.

With reference to FIGS. 10 and 11, a variation of the second embodiment will be described. FIG. 10 shows a part of a reading apparatus 10 in a housing as an example different from that of FIG. 7, from a viewpoint toward a platen 16 from a background board 17. In the example in FIG. 10, the platen 16 has an original document existent area A1 and original document non-existent areas A2 and A3. The original document non-existent areas A2 and A3 are located on both sides of the original document existent area A1. The original document existent area A1 and the original document non-existent areas A2 and A3 are aligned in the longitudinal direction of a reading unit 12. In other words, the platen 16 extends across the original document non-existent area A3, the original document existent area A1, and the original document non-existent area A2. Moreover, a sensor for reading an original document P (reading unit 12) extends across the original document non-existent area A3, the original document existent area A1, and the original document non-existent area A2. Moreover, the background board 17 facing the platen 16 also extends across the original document non-existent area A3, the original document existent area A1, and the original document non-existent area A2.

In the variation, a plurality of image sensors included in the entire length of the reading unit 12 include an image sensor belonging to an area 12a3 corresponding to the original document non-existent area A3, an image sensor belonging to an area 12a1 corresponding to the original document existent area A1, and an image sensor belonging to an area 12a2 corresponding to the original document non-existent area A2, and the reading unit 12 simultaneously performs reading of only the background board 17 by the image sensor belonging to the area 12a3, reading of the original document P and the background board 17 around the original document P by the image sensor belonging to the area 12a1, and reading of only the background board 17 by the image sensor belonging to the area 12a2. A controller 11 estimates background pixel values in peripheral areas on both sides of the original document P based on a read value obtained by reading the background board 17 on the original document non-existent areas A2 and A3 on both sides of the original document P.

That is, in step S135 (FIG. 8), the controller 11 repeatedly performs reading of original document P passing over the original document existent area A1 by the reading unit 12 (the image sensor belonging to the area 12a1), reading of the background board 17 in the original document non-existent area A2 by the reading unit 12 (the image sensor belonging to the area 12a2), and reading of the background board 17 in the original document non-existent area A3 by the reading unit 12 (the image sensor belonging to the area 12a3) in synchronism with one another. As a result of step S135, the controller 11 obtains, in addition to a two-dimensional read image which is a result of reading an area including the entirety of the original document P and a part of the background board 17 around the original document P, two background board read value tables 40 (FIG. 9) as described in the second embodiment, that is, a background board read value table 40 (first background board read value table 40) as a result of reading the background board 17 in the original document non-existent area A2 and a background board read value table 40 (second background board read value table 40) as a result of reading the background board 17 in the original document non-existent area A3.

The read values of the background board 17 associated with the same line images (line numbers) may be different between the first background board read value table 40 and the second background board read value table 40 which the controller 11 acquires at the same time. This is because when the original document P having a thickness is transported between the platen 16 and the background board 17, the distance H may be different between one side (side adjacent to the original document non-existent area A2) in a direction (longitudinal direction of the reading unit 12) orthogonal to a transport direction D and the other side (side adjacent to the original document non-existent area A3). When the original document P is inserted between the platen 16 and the background board 17 as shown in FIG. 2, and the background board 17 is separated from the platen 16 (or the platen 16 is separated from the background board 17), for example, a situation may occur in which the background board 17 (or the platen 16) tilts in a direction orthogonal to the transport direction D, and there may be hardly any increase in distance between the platen 16 and the background board 17 on the side adjacent to the original document non-existent area A2, and there is an increase in distance between the platen 16 and the background board 17 on the side adjacent to the original document non-existent area A3.

In consideration of such a situation, in step S155 (FIG. 8) of the variation, the controller 11 reads read values of the background board 17 for a corresponding one of the line images included in the read image from the background board read value table 40 and the second background board read value table 40. Background pixel values which are to be replaced with background reference values are specified on the side adjacent to the original document non-existent area A2 and on the side adjacent to the original document non-existent area A3 in the line image included in the read image based on the read values read from the first background board read value table 40 and the second background board read value table 40. That is, the controller 11 defines each line image included in the read image as an interest line image and reads read values corresponding to the line number of the interest line image from the first background board read value table 40 and the second background board read value table 40. When the read value read from the first background board read value table 40 is not included in the background reference range, a pixel value which is included in pixel values of pixels being included in the interest line image and being adjacent to the original document non-existent area A2 and which is the same as the read value which is read is specified as the background pixel value. Similarly, when the read value read from the second background board read value table 40 is not included in the background reference range, a pixel value which is included in pixel values of pixels being included in the interest line image and being adjacent to the original document non-existent area A3 and which is the same as the read value which is read is specified as the background pixel value.

The variation will be specifically described with reference to FIG. 11.

Read images IM shown in the upper section in FIG. 11 are parts of the read image (image read by the image sensor belonging to the area 12a1 of the reading unit 12) on which the process in step S155 is to be performed. In FIG. 11, as the read images IM, an image obtained by reading an area located in the original document existent area A1 and located on a side of the original document P adjacent to the original document non-existent area A2 (part of the background board 17 which is in original document existent area A1 and is adjacent to the original document non-existent area A2) is shown on the left and an image obtained by reading an area located in the original document existent area A1 and located on a side of the original document P adjacent to the original document non-existent area A3 (part of the background board 17 which is in original document existent area A1 and is adjacent to the original document non-existent area A3) is shown on the right.

In step S155, the controller 11 defines, for example, the line image of line number 13 of the read images IM as the interest line image. Moreover, a read value read from the first background board read value table 40 correspondingly to line number 13 is assumed to be 20, and a read value read from the second background board read value table 40 correspondingly to line number 13 is assumed to be 40. As in the above-described example, when the background reference range is 15 to 25, read value 20 falls within the background reference range, and read value 40 is out of the background reference range. Thus, the controller 11 specifies, as the background pixel value, pixel value 40 which is included in pixel values of pixels included in the interest line image and adjacent to the original document non-existent area A3 (on the right in FIG. 11) and which is the same as read value 40 read from the second background board read value table 40. As a result that the controller 11 performs the process on the line images of the read images IM (as a result of step S155), the controller 11 specifies, as background pixel values, pixel values in an area surrounded by a thick line frame as shown in the middle section in FIG. 11. Then, the controller 11 replaces each of the pixel values in the area surrounded by the thick line frame in the read images IM shown in the middle section in FIG. 11 with background reference value 20 to generate read images IM' as shown in the lower section in FIG. 11 (step S160). Then, the controller 11 detects edges ED of the original document image from the read images IM' (step S170).

According to the variation, even when the influence of the tilt of the background board 17 (or the platen 16) during the transportation of the original document P between the platen 16 and the background board 17 results in different read values of the background board 17 between both sides of the original document P (the side adjacent to the original document non-existent area A2 and the side adjacent to the original document non-existent area A3) at each timing at which the reading unit 12 reads the original document P, the controller 11 can accurately specify the background pixel values on the both sides, and thus, the original document image can be accurately clipped.

Note that when the tilt of the background board 17 (or the platen 16) as described above is taken into consideration, the same pixel values (for example, pixel value 40) of each line image of the read image, unlike FIG. 11, may not successive to some extent in the longitudinal direction of the line image but may gradually (for example, linearly) vary along the longitudinal direction of the line image. Thus, in step S155 of the variation, when the read value read from the first background board read value table 40 accordingly to the line number of the interest line image is not included in the background reference range, the controller 11 may specify, as background pixel values, a pixel value which is the same as the read value which is read and a pixel value within a predetermined difference range from the read value of pixel values of pixels included in the interest line image and adjacent to the original document non-existent area A2. Similarly, when the read value read from the second background board read value table 40 accordingly to the line number of the interest line image is not included in the background reference range, the controller 11 may specify, as background pixel values, a pixel value which is the same as the read value which is read and a pixel value within a predetermined difference range from the read value of pixel values of pixels included in the interest line image and adjacent to the original document non-existent area A3.

Not only in the variation but also in step S150 in the first embodiment and in step S155 in the second embodiment, the controller 11 may also specify, as background pixel values, a pixel value within a predetermined difference range from the read value in addition to a pixel value which is the same as the read value read from the background board read value table 20 and a pixel value which is the same as the read value read from the background board read value table 40 of the pixel values of the interest line image.

Alternatively, in step S155 of the variation, when the read value read from the first background board read value table 40 accordingly to the line number of the interest line image is not included in the background reference range, the controller 11 may collectively specify, as background pixel values, pixel values which are out of the background reference range, which successively change at a constant ratio of change between adjacent pixels, and which are included in pixel values of pixels included in the interest line image and adjacent to the original document non-existent area A2. Similarly, when the read value read from the second background board read value table 40 accordingly to the line number of the interest line image is not included in the background reference range, the controller 11 may collectively specify, as background pixel values, pixel values which are out of the background reference range, which successively change at a constant ratio of change between adjacent pixels, and which are included in pixel values of pixels included in the interest line image and adjacent to the original document non-existent area A3. Moreover, the controller 11 may assume a specific (for example, linear) change between the original document non-existent area A2 and the original document non-existent area A3 and estimate a background pixel value for each location between the original document non-existent area A2 and the original document non-existent area A3 for interpolation between the original document non-existent area A2 and the original document non-existent area A3, and based on the estimated background pixel value, the controller 11 may perform a process of replacing a pixel within a prescribed margin width with background reference value for each location.

Another embodiment will be described.

When the processes in the flowcharts in FIGS. 3 and 8 are performed, the controller 11 does not have to always perform step S110. After determining the background reference value in step S110, the controller 11 stores the reference value and a background reference range based on the reference value in, for example, a storage unit 15. Thereafter, the processes in the flowcharts in FIGS. 3 and 8 may be performed based on the background reference value and the background reference range which are stored.

The controller 11 may lower the resolution for a read image used for detection of edges of the original document image. For example, the controller 11 lowers the resolution of the read image subjected to steps S160 and S170 at a timing between step S150 and step S160 shown in FIG. 3 to reduce the data size. Moreover, the controller 11 lowers the resolution of the read image to be subjected to steps S160 and S170 at a timing between step S155 and step S160 shown in FIG. 8 to reduce the data size. Thus, lowering the data size of the read image to be subjected to steps S160 and S170 enables the process load of the controller 11 in steps S160 and S170 to be reduced. Moreover, the read image to be subjected to steps S160 and S170 is merely an image for detection of the edges but is not a read image from which the original document image is to be clipped in step S180. Thus, reducing the data size as described above causes no problem.

The process of replacing the background pixel value with the background reference value (step S160 in FIGS. 3 and 8) is not essential. The background pixel value specified as described above in step S150 (FIG. 3) and step S155 (FIG. 8) does not belong to the background reference range, and thus whether or not the background pixel value is the read value of the background board 17 appears unclear, but the background pixel value is a pixel value which should be deemed to be the read value of the background board 17 to detect the edges of the original document image (step S170). In other words, to detect the edges, the controller 11 just has to be aware of handling the specified background pixel value in a similar manner to the pixel value belonging to the background reference range. Thus, after specifying a background pixel value in the read image in step S150 and step S155, the controller 11 may omit step S160 and may deem the specified background pixel value to be a pixel value belonging to the background reference range so as to detect the edges of the original document image in step S170.

The background board read value table 20 (FIG. 4) prepared in advance in the first embodiment may be stored, not in the storage unit 15 in the reading apparatus 10, but in an external memory apparatus (e.g., PC or a server accessible via the communication IF 14) with which the reading apparatus 10 can communicate. The controller 11 may accordingly refer to the background board read value table 20 stored in the external memory apparatus in the process in step S150 (FIG. 3).

What is claimed is:

1. A reading apparatus configured to read an original document, the reading apparatus comprising:
    a background board placed behind the original document;
    a sensor configured to obtain a read image by repeatedly reading a line-image at a prescribed frequency; and
    a clipping processor configured to estimate a background pixel value which is a read value of the background board and to clip an image of the original document from the read image based on the background pixel value which is estimated, the read value changing due to an increase in distance between the sensor and the background board caused by the original document, the read image being a result of reading an area including the original document and the background board.

2. The reading apparatus according to claim 1, wherein the clipping processor is configured to specify an area to be clipped after replacing the background pixel value which is estimated and which is included in the read image with a prescribed value and to clip the area which is specified.

3. The reading apparatus according to claim 1 further comprising:
    a measurement unit configured to measure the distance between the sensor and the background board, wherein the clipping processor is configured to estimate the background pixel value based on a result of measurement by the measurement unit.

4. The reading apparatus according to claim 1, wherein the clipping processor is configured to estimate, based on a read value obtained by reading the background board in an original document non-existent area where the original document does not exist, the background pixel value in a peripheral area of the original document, the peripheral area being different from the original document non-existent area.

5. The reading apparatus according to claim 4, wherein the clipping processor is configured to estimate, based on a read value obtained by reading the background board in the original document non-existent area on each of both sides of the original document, the background pixel value in the peripheral area on each of the both sides of the original document.

6. A reading apparatus configured to read an original document, the reading apparatus comprising:

a background board placed behind the original document;

a platen placed in front of the original document; and a sensor configured to obtain a read image by repeatedly reading a line-image of the original document transported between the background board and the platen at a prescribed frequency, the platen extending across an original document existent area over which the original document which is transported passes and an original document non-existent area over which the original document which is transported does not pass, and the sensor and the background board extending across the original document existent area and the original document non-existent area.

7. The reading apparatus according to claim 6, wherein the platen extends across the original document existent area and a plurality of the original document non-existent areas on both sides of the original document existent area, and the sensor and the background board extend across the original document existent area and the original document non-existent areas on the both sides of the original document existent area.

8. An image generation method for generating an image of an original document, the image generation method comprising:

obtaining, by a sensor, a read image by repeatedly reading a line-image of the original document between a background board and the sensor at a prescribed frequency;

estimating, by a clipping processor, a background pixel value which is a read value of the background board and which changes due to an increase in distance between the sensor and the background board caused by the original document; and clipping, by a clipping processor, an image of the original document based on the background pixel value which is estimated from the read image which is a result of reading an area including the original document and the background board.

\* \* \* \* \*